(12) United States Patent
Bettinger et al.

(10) Patent No.: US 6,235,357 B1
(45) Date of Patent: May 22, 2001

(54) DYNAMIC POLYMER COMPOSITES

(76) Inventors: David S. Bettinger, 8030 Coventry, Grosse Ile, MI (US) 48138-1119; Frederick Stoll, 7537 Hastings Point, West Chester, OH (US) 45069

(*) Notice: Subject to any disclaimer, the term of this patent is extended or adjusted under 35 U.S.C. 154(b) by 0 days.

(21) Appl. No.: 09/268,280

(22) Filed: Mar. 15, 1999

(51) Int. Cl.⁷ .................................................. B65B 53/00
(52) U.S. Cl. ...................... 428/34.9; 428/35.1; 428/35.7; 428/36.3; 428/36.9; 428/297.4; 428/913
(58) Field of Search ...................... 428/34.9, 35.1, 428/35.7, 36.3, 36.9, 297.4, 913

(56) References Cited

U.S. PATENT DOCUMENTS 5,188,260 * 2/1993 Bettinger ................................. 222/95
5,552,197 * 9/1996 Bettinger ................................. 428/34.9
5,752,926 * 5/1998 Larson et al. ............................... 602/7

* cited by examiner

Primary Examiner—Edward J. Cain

(57) ABSTRACT

A two phase polymer composite comprises high-modulus, continuous, pre-stressed fibers selected to maintain tension within a discontinuous fiber-reinforced polymer matrix selected to compressively restrain the pre-stressed fibers below an activation temperature. Whereas above an activation temperature the discontinuous fiber-reinforced polymer matrix is selected to cease restraint and deform to provide an external force release and dimensional change. The composite material is imparted with the characteristics of increased strength, as well as increased creep and impact resistance.

4 Claims, 2 Drawing Sheets

DYNAMIC POLYMER COMPOSITES

BACKGROUND OF THE INVENTION a) Field of the Invention

The present invention relates to a reinforced structural composite consisting of fibers in a polymer matrix; and, in particular, to a responsive, externally-activated two phase material consisting of pre-stressed continuous fibers, restrained and controlled by a discontinuous fiber reinforced polymer matrix, wherein both matrix and matrix reinforcing relax at and above a specified temperature.

For the purpose of the current invention the term "fiber" is defined to mean a slender and greatly elongated shape from natural and synthetic material which has tensile strength and comprises fiber, thread, fiber bundles, tow, and filament bundles.

b) Description of the Prior Art

Since the advent of high-strength fibers and their incorporation into polymer composites, the focus within the prior art has been on the structural ability of composites to resist external forces. A multitude of fibers, fiber arrangements, and polymer matrix compositions has been utilized for structural composites. Structural composites are inert materials resisting loads. The present invention concerns a polymer composite that generates force as well as resists force.

In the polymer composite prior art Bettinger, U.S. Pat. No. 5,552,197, discloses dynamic polymer composites which generate delayed dimensional change and force due to pre-stressed fibers constrained and controlled within and by a responsive polymer matrix whereby the response is self-activated time-dependent. Bettinger is limited by the strength of a non-reinforced matrix and the transverse strength of a matrix reinforced by longitudinal fibers. Bettinger is a cylindrical mechanism not a material. The compressive force of Bettinger is limited.

SUMMARY OF THE INVENTION

This two-phase composite comprises high-modulus continuous pre-stressed fibers selected to maintain tension over a temperature range both below and above an activation temperature. The continuous fibers are within a polymer matrix reinforced with short, discontinuous fibers. The reinforced matrix is selected to compressively restrain the pre-stressed fibers below an activation temperature. Above this activation temperature the selected polymer matrix ceases restraint and deforms to provide an external force release and dimensional change. The reinforced polymer matrix is the responsive component and acts to restrain, balance, and control stress that was induced in the fibers during the process for preparing the composite material. Once this polymer matrix is prepared the discontinuous short length fibers impart desirable structural characteristics: high creep resistance, high strength, and high impact resistance.

1. Objects of the Invention

A general object of this invention is to provide a dynamic polymer composite material that is highly resistant to creep particularly during storage and shipping prior to activation.

Another general object of this invention is to provide a responsive composite material that possesses high strength in service.

Another general object of this invention is to provide a responsive composite material that is impact resistant in service.

Another general object of this invention is to develop a structural, dynamic, polymer composite material to be utilized for connecting composite structures.

Another general object of this invention is to provide a material that may be incorporated into actuators for deployment, retraction, contraction, and expansion mechanisms replacing complex and expensive electromechanical actuators.

2. Features of the Invention

In keeping with these objects and others which will become apparent hereinafter, one feature of the present invention resides, briefly stated, in the discontinuous fiber reinforced and responsive polymer matrix which affords the composite with the attributes of high creep resistance, high structural strength, and high impact resistance.

Another feature of this invention is that the key to the design versatility of this new structural composite is the selection of the discontinuous fibers that provide compressive reinforcement within the polymer matrix and yet yield with the polymer matrix. The polymer matrix controls the release of the continuous fiber tension. The composite response is on-demand externally-activated based on exposure to independent stimuli such as heat, light, or chemicals.

Another feature of this invention is the ease of activation without the need for solvents or tools beyond a heat source.

In order to overcome the previously mentioned deficiencies and problems in the prior art, this invention discloses a two phase dynamic polymer composite comprising high-modulus, continuous, pre-stressed fibers within a polymer matrix possessing a Tg below that of the continuous fibers, and compressively reinforced by discontinuous short fibers with a Tg below that of the polymer matrix, such that when the composite temperature is greater than the Tg of the matrix, this compressive reinforcement ceases. Simultaneous to this cessation the tension fibers force the deformation of the polymer matrix when activated by heating above the Tg of the polymer matrix. By careful selection of the discontinuous fibers to be entrained within the polymer matrix the structural attributes of creep resistance, structural strength, and impact resistance can be controlled.

A two phase polymer composite comprises:
 a) high-modulus, continuous, pre-stressed fibers selected
   to maintain tension below and above an activation temperature, within
 b) a polymer matrix selected
   to compressively restrain said pre-stressed fibers below, and
   to cease said restraint and deform above said activation temperature to provide an external force release and dimensional change, reinforced by
 c) discontinuous and short fibers selected
   to maintain a high modulus below, and
   to relinquish modulus above said activation temperature.

It will be recognized by one of ordinary skill in the art that the continuous fibers used in the polymer matrix may be knit, braided, sewn and woven. Discontinuous fibers are generally featured in sheet molding and injection molding processes. It is understood by one of ordinary skill in the art that certain embodiments of the present invention may be incorporated into devices for connectors, structural assembly, and mechanism actuation. These and other modifications and applications of the present invention will become apparent to those skilled in the art in light of the following description of embodiments in this invention.

Drawing Description:

BRIEF DESCRIPTION OF THE DRAWINGS

The present invention is further described with reference to the accompanying drawings in which.

DETAILED DESCRIPTION

Figure 1:
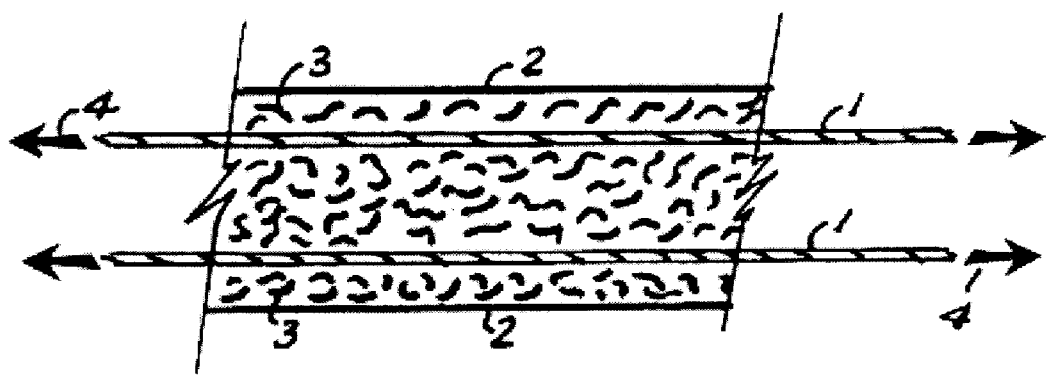
FIG. 1 is a partial section through the composite of the current invention showing continuous and discontinuous fibers within the polymer matrix.

FIG. 1. shows the pre-stress tension in continuous fiber tow (4) exerted on the long continuous fibers (1) that are within the polymer matrix (2) reinforced with short discontinuous fibers (3) which are selected to compressively restrain this reinforced matrix (2) below an activation temperature.

Figure 2:
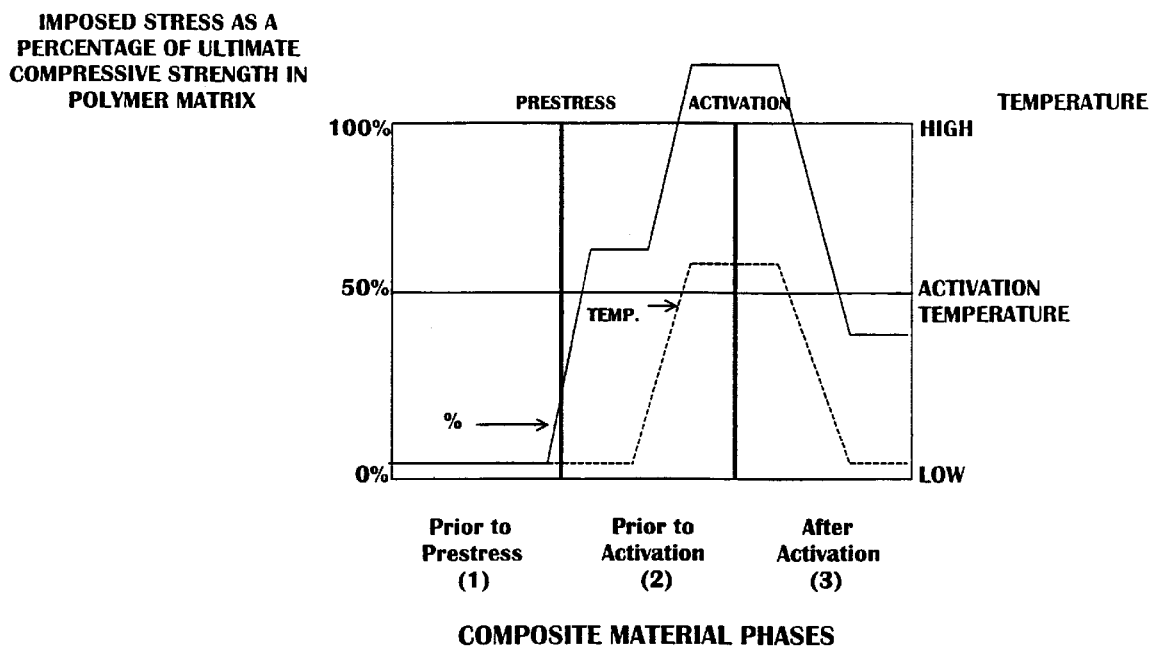
FIG. 2 is a schematic of the material attributes through the phases experienced by the composite material.

It is understood that like objects will be like numbered. FIG. 2. illustrates the imposed stress as a percentage of ultimate compressive strength in the polymer matrix and short fibers plotted against the change in the composite material phase. The preparation of this novel two phase polymer composite comprises the steps of a) enveloping the high-modulus, continuous fibers within a polymer matrix reinforced by discontinuous and short fibers, b) softening the matrix, c) post-tensioning the continuous fibers by external means, d) stabilizing the matrix, and e) releasing the continuous fibers from the external post-tensioning restraint to seek a stress balance with the matrix. The increase in imposed pre-stress going from the prior to pre-stress phase (1) to pre-stress point is accounted for by the contribution of the pre-stressed continuous fibers. When the pre-stressed continuous fibers are cut at the surface of the matrix, the polymer matrix and discontinuous fibers pick up the compressive stress from the continuous fibers. The ability of the polymer matrix to communicate stress to the fibers depends upon fiber orientation. Fibers act in shear and compression depending upon the orientation.

Prior to activation when the polymer composite sits on the shelf or is in transit, the imposed stress remains constant. As the polymer composite is activated, the polymer matrix and the discontinuous fibers decrease in strength. The decrease in strength is shown in the figure as an increase in imposed stress as a percentage of ultimate compressive strength.

After activation the discontinuous fibers go limp because their Tg is traversed, causing the polymer matrix to be squeezed by the continuous fibers. This dimensional change which is available for external utility and force generation is shown in the figure as a decrease in imposed stress as a percentage of ultimate compressive strength.

DESCRIPTION OF THE PREFERRED EMBODIMENTS

A Two Phase Polymer Composite With a Polymer Matrix Selected From a Thermoplastic Resin The high-modulus, continuous fibers used are selected to possess the ability to carry substantial stress with loss at temperatures higher than the Tg of the polymer matrix and are selected from graphite, DuPont Kevlar®, Hoechst Celanese PBI, steel, and fiberglass. One experienced in engineered composites will realize the design versatility offered by a) the ability to select the fiber and fiber/matrix ratio based upon the total force required, and b) the ability to select the fiber shape to provide the elongation required.

The polymer matrix is of the thermoplastic type. Some preferable matrix materials of the thermoplastic category are polyvinyl chloride (PVC), acrylonitrile/butadiene/styrene (ABS), modified acrylonitrile, and high-performance polyesters. One experienced in engineered composites will realize the design versatility offered by the ability to select the polymer to fit both the activation method and the conditions encountered.

The short and discontinuous fibers that reinforce the polymer matrix are selected from Nylon 610 and Vectran HS. The discontinuous fibers range in length from 6 to 12 mm.

A Two Phase Polymer Composite With a Polymer Matrix Selected From a Thermosetting Resin The polymer matrix is of the thermoset type. Some preferable matrix materials of the thermoset category are the EPON® Series epoxy resins (Shell Chemical Company).

EXAMPLE 1

A Two Phase Thermoplastic Polymer Composite

The high-modulus fibers used are made from DuPont's Kevlar® and are arranged in a tow of length 45 mm. The polymer matrix material is polyvinyl chloride (PVC) which has a Tg of 126° F. The short and discontinuous fibers which reinforce the polymer matrix are Nylon 610 (Tg=40°C.) which have a diameter of 1 mm and a length of 8 mm. After activation of the polymer composite by heating, these Nylon 610 fibers go limp because their Tg of 40 degrees Centigrade is traversed.

EXAMPLE 2

A Two Phase Thermosetting Polymer Composite

The high-modulus fibers used are made from PPG fiberglass and are arranged in a tow of length 30 mm. The polymer matrix material is an epoxy resin, Epon® Resin 828/EPI-CURE® Curing Agent 9552, which has a Tg of 102 degrees Centigrade. The short and discontinuous fibers which reinforce the polymer matrix are Vectran HS (Hoechst Celanese) which have a diameter of 0.5 mm and a length of 10 mm. After activation of the polymer composite by heating, these Vectran HS fibers go limp because their Tg of around 250 degrees Fahrenheit is traversed.

What is claimed is:

1. A dynamic polymer composite comprising:

high-modulus, continuous, pre-stressed fibers selected
   to maintain tension above an activation temperature, within a polymer matrix selected
   to compressively restrain said pre-stressed fibers below, and
   to cease said restraint and deform above said activation temperature to provide an external force release and dimensional change, said matrix reinforced by discontinuous and short fibers selected
   to maintain a high modulus below, and
   to relinquish said high modulus above said activation temperature.

2. A dynamic polymer composite of claim 1, wherein said polymer matrix is selected to be a thermoplastic material.

3. A dynamic polymer composite of claim 1, wherein said polymer matrix is selected to be a thermosetting material.

4. A dynamic polymer composite of claim 1, wherein said polymer matrix is selected to activate dimensional change in response to heat, light, and chemicals.

* * * * *